(12) United States Patent
Binder

(10) Patent No.: US 6,396,391 B1
(45) Date of Patent: May 28, 2002

(54) COMMUNICATIONS AND CONTROL NETWORK HAVING MULTIPLE POWER SUPPLIES

(75) Inventor: Yehuda Binder, Hod Hasharon (IL)

(73) Assignee: Serconet Ltd., Netanya (IL)

( * ) Notice: Subject to any disclaimer, the term of this patent is extended or adjusted under 35 U.S.C. 154(b) by 0 days.

(21) Appl. No.: 09/141,321

(22) Filed: Aug. 27, 1998

(51) Int. Cl.$^7$ .............................................. H04M 11/04
(52) U.S. Cl. ........................... 340/310.01; 340/310.05; 340/310.06; 340/310.07; 455/3.3; 375/258
(58) Field of Search ....................... 340/310.01, 310.05, 340/310.06, 310.07; 455/3.3, 3.1, 280; 375/257, 258, 259

(56) References Cited

U.S. PATENT DOCUMENTS

| | | |
|---|---|---|
| 3,824,450 A | 7/1974 | Johnson et al. .............. 323/272 |
| 4,101,862 A | 7/1978 | Takagi et al. .................. 338/23 |
| 4,238,812 A | 12/1980 | Middleman et al. ........ 361/106 |
| 4,609,828 A | 9/1986 | Small .......................... 307/44 |
| 5,081,440 A | 1/1992 | Ott et al. ...................... 323/23 |
| 5,095,417 A | 3/1992 | Hagiwara et al. .............. 700/9 |
| 5,148,144 A | 9/1992 | Sutterlin et al. ........ 340/310.01 |
| 5,200,643 A | 4/1993 | Brown .......................... 307/53 |
| 5,424,710 A | 6/1995 | Baumann ...................... 323/23 |
| 5,454,008 A | 9/1995 | Baumann et al. ............ 375/369 |
| 5,469,150 A | 11/1995 | Sitte ...................... 340/825.07 |
| 5,475,687 A | 12/1995 | Markkula, Jr. et al. ..... 709/224 |
| 5,652,893 A | 7/1997 | Ben-Meir et al. ............. 323/23 |
| 5,805,053 A | * | 9/1998 | Patel et al. ............ 340/310.01 |
| 5,949,327 A | * | 9/1999 | Brown .................. 340/310.01 |

FOREIGN PATENT DOCUMENTS

WO           9415424        7/1994

* cited by examiner

*Primary Examiner*—Daryl Pope
(74) *Attorney, Agent, or Firm*—Browdy and Neimark

(57) ABSTRACT

A network allowing for communication, sensing and control, comprising at least three nodes interconnected by a bus for conveying both power and data. The bus includes at least two power carrying conductors, which may be used to convey the data together with the power, and across which at least two power supplies are connected via respective source couplers at different points thereof Preferably, there are connected to the nodes one or more payloads that may be powered by local power supplies so as to provide greater fault-protection and flexibility.

19 Claims, 8 Drawing Sheets

_COMMUNICATIONS AND CONTROL NETWORK HAVING MULTIPLE POWER SUPPLIES_

FIELD OF THE INVENTION

This invention relates to the field of wired communication and control systems, in particular to such systems which provide for simultaneous distribution of power and message information along the network wires in a network having a plurality of sensors, actuators and processing elements.

BACKGROUND OF THE INVENTION

Ethernet-based networks are popular as Local Area Networks (LANs) used for computer and communication networks, and are standardized under IEEE802. The network physical media are usually based on copper conductors, interconnecting between the various units comprising the network. Usually twisted-pair or coaxial cables are used. Terminals constituting Data Terminal Equipment (DTE) are connected to the network via 'network adapter' units that are tapped into the media. The adapters (also referred to as 'nodes, network card etc.) handle the interface between the media comprising the bus and the payload units. In a LAN environment, the network adapters are usually housed within the DTE enclosure, and both the DTE and the adapter are locally powered by a power supply within the DTE enclosure. However, in some control networks, power is distributed centrally via the network so as supply power either to the network adapters only or to both the network adapters and the payloads.

FIG. 1 shows such a network 10 comprising a backbone or bus 11 having power and data lines 12 and 13, respectively. A dedicated power source 14 is connected across the power lines 12 whilst various adapters 15, 16 and 17 are connected across both the power and data lines 12 and 13 so as to receive power and allow for bi-directional communication with other adapters via the bus. The adapters 15, 16 and 17 can be standalone units ('hub' units), or housed in the DTE enclosure, as is the case in network cards which are housed within a Personal Computer enclosure. The use of the dedicated power source 14 that provides power to all of the adapters in the network obviates the need to supply power locally to each of the adapters separately.

Payloads 18, 19 and 20 are connected to the adapters 15, 16 and 17 respectively. As seen, the payload 18 has both power and data connections to the adapter 18 so as to receive power therefrom and effect bidirectional data communication therewith. The payload 20 is connected directly to the power lines 12 so as to receive power directly therefrom, whilst the payload 19 is powered via a local power supply 21. It should be noted that in the following description and annexed figures, the terms "power source" and "power supply" are used interchangeably.

U.S. Pat. No. 5,475,687 (Markkula et al.) is representative of a large number of patents describing networks employing the same 'bus' network topology for control and automation. Specifically, nodes are used to interface between the network media and the sensors/actuators used as payloads. Similar to the LAN application, the nodes can be integrated into the payload or used as standalone units.

Although control networks can use the same powering scheme as described above, where each payload and its associated node are independently locally powered, other approaches are more popular in order to reduce wiring and powering complexity. The most popular powering method involves carrying the power in the network wires in addition to the data. This is usually performed using one of the following possibilities:

(a) Additional dedicated power wires are used along with the data wires, as shown in FIG. 1 and described in U.S. Pat. No. 5,469,150 (Sitte).

(b) Power and data are transmitted together over the same media, as described in U.S. Pat. Nos. 5,454,008 (Baumann et al.) and 5,148,144 (Sutterlin et al.) In this case, each node contains special circuitry in order to separate the data and power. In addition, means (shown as "Source Coupler" in FIG. 2) must be provided to interface the power supply to the bus in order that the low source impedance and power supply noise do not affect the data—transmission in the network.

FIG. 2 shows schematically a network 25 employing so-called "Token Ring" topology, wherein a plurality of nodes is serially connected one to another. In addition, the network conforms to such an arrangement so as to send both power and data along the same wires. The network 25 comprises a bus shown generally as 26 fed by a power source 27 interfaced to the bus 26 by means of a source adapter 28. The source adapter 28 ensures that the low-source impedance and supply noise do not affect the data communication in the network. Network adapters or nodes 30, 31 and 32 are serially connected to the bus 26 via discrete bus sections 26a, 26b, 26c and 26d so as to receive combined power and data signals therefrom and feed data signals thereto. Payloads 33, 34 and 35 are connected to the adapters 30, 31 and 32 respectively. The payloads 33 and 35 have both power and data connections to the respective adapters 30 and 32 so as to receive power therefrom and effect bidirectional data communication therewith. In contrast thereto, the payload 34 is powered via a local power supply 36. In this case, each node contains special circuitry in order to separate the data and power.

Although the power carried in the bus 26 can be used for both the nodes and the payloads (as shown in payloads 33 and 35), this imposes a limit either on the power consumption of the payload or on the total length of the wires constituting the network. This limitation is overcome by the combined approach shown in FIGS. 1 and 2, wherein the nodes (usually low-power units) are powered from the network, while highly consumption payloads such as 19 and 34 are locally fed.

U.S. Pat. No. 5,095,417 (Hagiwara et al.) describes a control network employing Ring topology wherein nodes are connected in cascade in a manner similar to that shown in FIG. 2. The two end nodes are likewise cascaded so as to form a complete ring. Similar to the above discussion, separated or combined power/data lines can be used, and nodes/payloads can be powered locally or from the network.

In all types of buses described, regenerators are usually allowed. Regenerators (also referred to as repeaters, routers, bridges etc., according to their complexity and functionality) are used in order to extend the bus length limit. In addition, repeaters can also be used for connecting two distinct, physically separate networks performing different functions. The repeater is usually added as 'cut and add', in series with the existing lines. Similar to nodes, repeaters can be fed locally or from the network. The latter is preferred, since there is then no need to route additional wires to the repeater. As demonstrated above, networks can be categorized as follows:

(a) Wiring topology. Either 'bus' topology can be used, as demonstrated in FIG. 1, or 'serially connected' wiring topology can be used (illustrated in FIG. 2). Mixed networks can also be implemented. For example, data lines can be serially connected in cascade while the power lines are connected in 'bus' topology.

(b) Powering scheme. Three powering schemes can be employed. The first involves the case where the network adapters and the payloads are locally fed. This is usually the case in LAN systems, where line powering is not used. The second scheme involves the case where the nodes are fed from power carrying wires included in the network wiring, as shown in FIG. 1. The third option refers to the case where the payloads are also fed from the network, either by directly connecting to the network wiring (Payload 20 in FIG. 1) or fed via the network adapter (Payload 18 in FIG. 1). Mixtures of the above schemes can also be implemented, as described in FIGS. 1 and 2.

Known network configurations using line powering as described above with reference to FIGS. 1 and 2, employ a single power supply only, usually connected at an end of the line, although this is not mandatory. This approach suffers from the following problems:

(a) Range limitation. The DC resistance of the wires causes loss of power which is dependent upon the wire resistance (effected by diameter and resistivity) and its length. As such, the wires are subjected to a maximum length limitation. This can be overcome by raising the voltage used (similar to the way electrical supply utilities distribute electrical power). However this solution is problematic owing to safety issues, and is also more complicated and expensive owing to the need for wide-input range converter in the nodes.

(b) Source Reliability. In the case of power supply failure, the whole network crashes due to lack of power to the nodes.

(c) Redundancy. In the case of a failure in any of the nodes or in the wires (short or cut in any power-carrying wire), the part of the network beyond the failure point will not be powered, and will stop functioning. Furthermore, a short in the power lines may stall operation for the whole network.

(d) Lack of 'Hot-swap' capability—i.e. there is no capability to add, remove or change a power supply without any effect on the network operation. This is very problematic for maintenance, where it may be required to upgrade the network by adding a power supply, changing its power capacity etc.

The above-mentioned problems associated with the use of only a single power supply may be overcome by using multiple power supplies to power the network, employing similar techniques to those used to power a single load. FIG. 3 shows a known prior art system depicted generally as 40 conforming to this approach comprising a load 41 powered by multiple power supplies of which three are shown, enumerated 42, 43 and 44 coupled to the load 41 via respective supply adapters 45, 46 and 47. Such a configuration addresses three of the drawbacks associated with systems employing a single power supply only:

(a) Redundancy. In the case of failure in any of the power supply units, the remaining power supply units continue to feed the load. If any output on one power supply shorts or simply shuts down, the other remaining power supply units will take over and supply the full rated load.

(b) Source Reliability. Each power supply unit may feed portion of the required power. Consequently, each power supply unit may operate at less than rated capacity, resulting in higher reliability.

(c) Hot-swap capability. One or more power supply units can be added, removed or changed without any effect on the network operation.

Various types of stand-by are known. In 'Hot Stand-by' only one unit is active, and another unit operates only in the case of malfunction of the first unit. In 'shared' mode of operation, each unit supplies a portion of the required power. These concepts are usually designated as 'redundant' or 'parallel' operation, and are also referred to as 'N+1' or 'N+X' configuration.

As shown in FIG. 3, multiple power supply operation usually requires additional circuitry in the form of the supply adapters to control and manage the total operation. Each supply adapter is usually integrated into the corresponding power supply, making it capable of operation in an environment employing multiple power supplies. Various techniques for high performance methods for paralleling power supplies are described in U.S. Pat. No. 4,609,828.

FIG. 4 shows a common, simple, effective and cost-effective prior art network 50 for combining two DC power supplies 51 and 52 which provide power to a load 53 via respective supply adapters 54 and 55. The supply adapters 54 and 55 have respective positive outputs 56 and 56' and negative outputs 57 and 57'. The negative outputs 57 and 57' are commonly connected to the load 53 whilst the positive outputs 56 and 56' are connected to the load 53 via respective rectifier diodes 58 and 59 whose anodes are connected to the respective positive outputs 56 and 56'. Such a mechanism allows for full redundancy: In the case of failure in either of the supplies, its associated diode will be reverse biased hence presenting high impedance, thus effectively disconnecting the power supply from the load. In addition, power supplies can be added and removed without disrupting the supply to the load. This technique is commonly referred to as 'diode-summing' or 'OR'-ing diodes. The fact that the diode forward bias voltage $Vf$ is directly proportional to the diode forward bias current $If$, leads to equal power distribution between the two power supplies 51 and 52 since they both provide half the total load current when both are operational. While this is not necessary in a redundant approach, it is preferable, as each power supply will see roughly the same power level.

Whilst multiple power supplies are known for sourcing a single load, there being no prior art provision to share multiple power supplies amongst a network which comprises more than one load, wherein the supplies are connected to distinct points in a network. In a network having a large number of loads, it is not feasible to multiple source all of the loads owing to both cost and space considerations. As a result, multiple sourcing is provided only in respect of high priority loads, whilst the remaining loads are commonly powered via the network bus. Moreover, since prior art networks provide for only a single power source to be connected to the network bus, a failure in that power source results in a total failure of the network and the length of conductors in the bus is inherently limited.

SUMMARY OF THE INVENTION

It is an object of the invention to provide a network whose communication media are based on conductors and which allows for the units connected to the communication media to be fed by multiple power sources.

According to the invention there is provided a network allowing for communication, sensing and control, said network comprising:

at least three nodes interconnected by a bus for conveying both power and data to said nodes, said bus including at least two power carrying conductors, and at least two power supplies connected via respective source couplers across the power carrying conductors at different points thereof.

Preferably, there are connected to the nodes one or more payloads that may be powered by local power supplies so as to provide greater security and flexibility.

In such a network the wires constituting the network bus are unlimited in length, since additional power supplies can be added in order to compensate for resistive losses in the bus. Furthermore, redundancy is achieved against both power supply faults and network faults. Moreover, by allowing the live removal or insertion of power supplies to and from the network power bus, a "hot-pluggable" redundant power supply system provides a practical way to achieve zero downtime required in some applications.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

Figure 5:
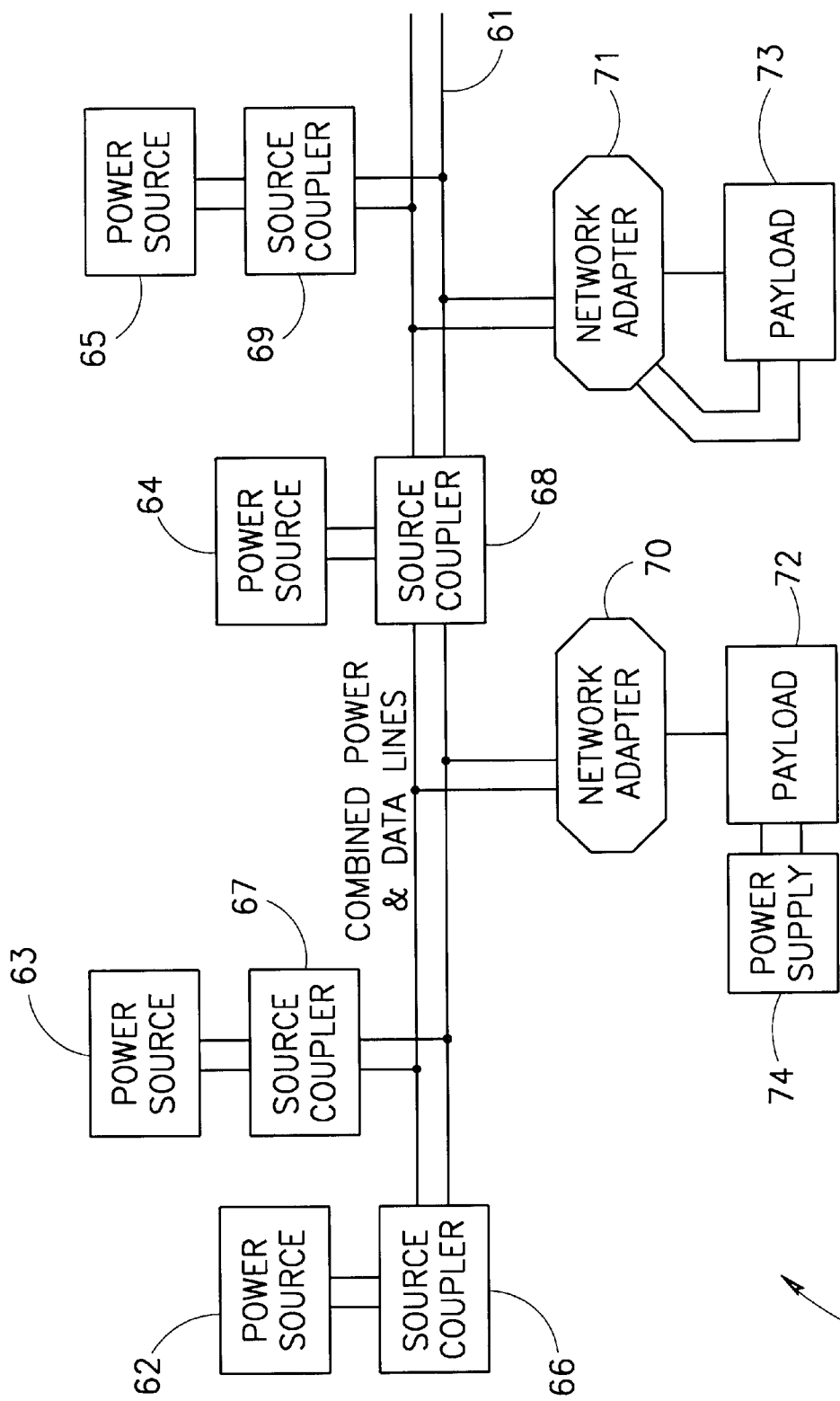
FIG. 5 is a schematic representation of a network according to a first embodiment of the invention.

FIG. 5 shows schematically a network 60 comprising a bus 61 formed of either twisted-pair or coaxial cable for conveying both power and data. Such a cable constitutes a pair of "power carrying conductors" which, in such a configuration, are also employed for conveying data. Four power supplies 62, 63, 64 and 65 are coupled to the bus 61 via respective source couplers 66, 67, 68 and 69 each connected to the bus 61 at different points thereof. This provides the following benefits:

(a) No power limit for wires length. The power supplies can be located at intervals, such that each power supply covers a portion of the network. If longer range is required or higher power consumption nodes or payloads are added, additional supplies can be added at relevant points in the network.

(b) Redundancy against power supply faults. If the power supplies are located at intervals which are closer than required by powering limitations, and the available power is sufficient, redundancy is achieved in the overlapped part of the network, featuring protection against single power supply fault. Careful planning can achieve full redundancy all over the network.

(c) Redundancy against faults. In the case of failure in any node/payload, or in the media, power can still reach the units. For example, in the case of a linear bus having a pair of power supplies connected at both ends, any cut in the power carrying wires will not discontinue the power to the units.

(d) Easy maintenance. By allowing the live removal or insertion of power supplies to and from the network power bus, a "hot-pluggable" redundant power supply system provides a practical way to achieve zero downtime required in some applications.

Also coupled to the bus 61 via respective network adapters 70 and 71 are a pair of payloads 72 and 73. The payload 72 effects data communication only with the network adapter 70 and is powered by a local power supply 74. In contrast thereto, the payload 73 effects both data and power communication with the network adapter 71.

In the case where power is also carried by the network data wires, each of the power supplies interfaces the network media via the respective source coupler. The source coupler 66 is located at an extreme end of the bus 61. In similar manner, the source couplers 67 and 69 are tapped into the wires whilst the source coupler 68 is connected to the bus 61 by cutting the wires and inserting.

In such an arrangement AC and DC power can be equally well implemented. However, DC power is usually preferred owing to its lack of frequency components, which can interfere with data transmission. In addition, DC power handling is simpler and more cost-effective.

Figure 4:
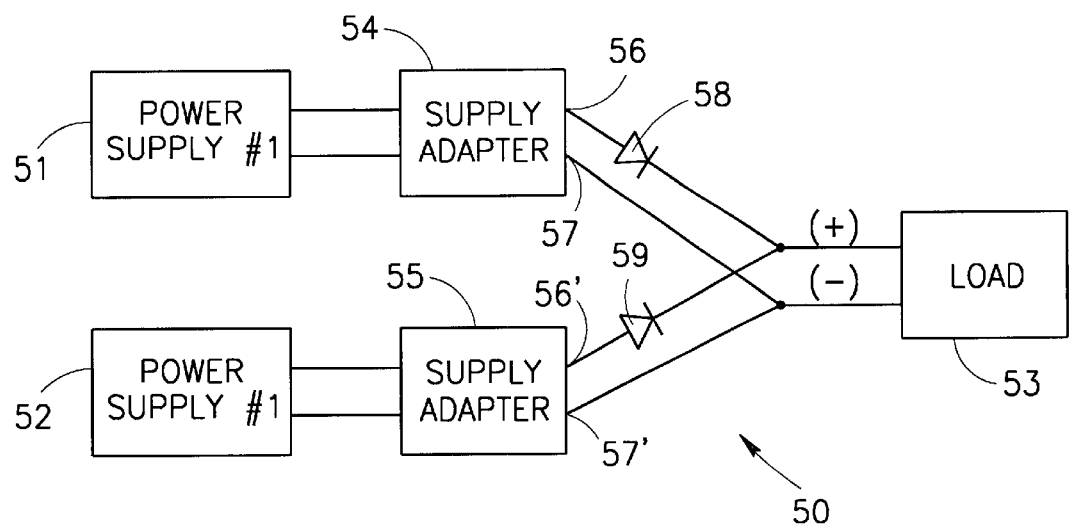
FIG. 4 is a schematic representation of an implementation of the prior art circuit shown in FIG. 3 for supplying a DC load.

Such an arrangement may be implemented in two different ways: the first using dedicated power lines distinct from the data lines; and the second where power and data are multiplexed along the same wires. In the first case, most prior art techniques for combining multiple power supplies can be directly used. For example, the 'diode-summing' mechanism shown in FIG. 4 can be implemented directly as will now be described with reference to FIG. 6 of the drawings.

Figure 6:
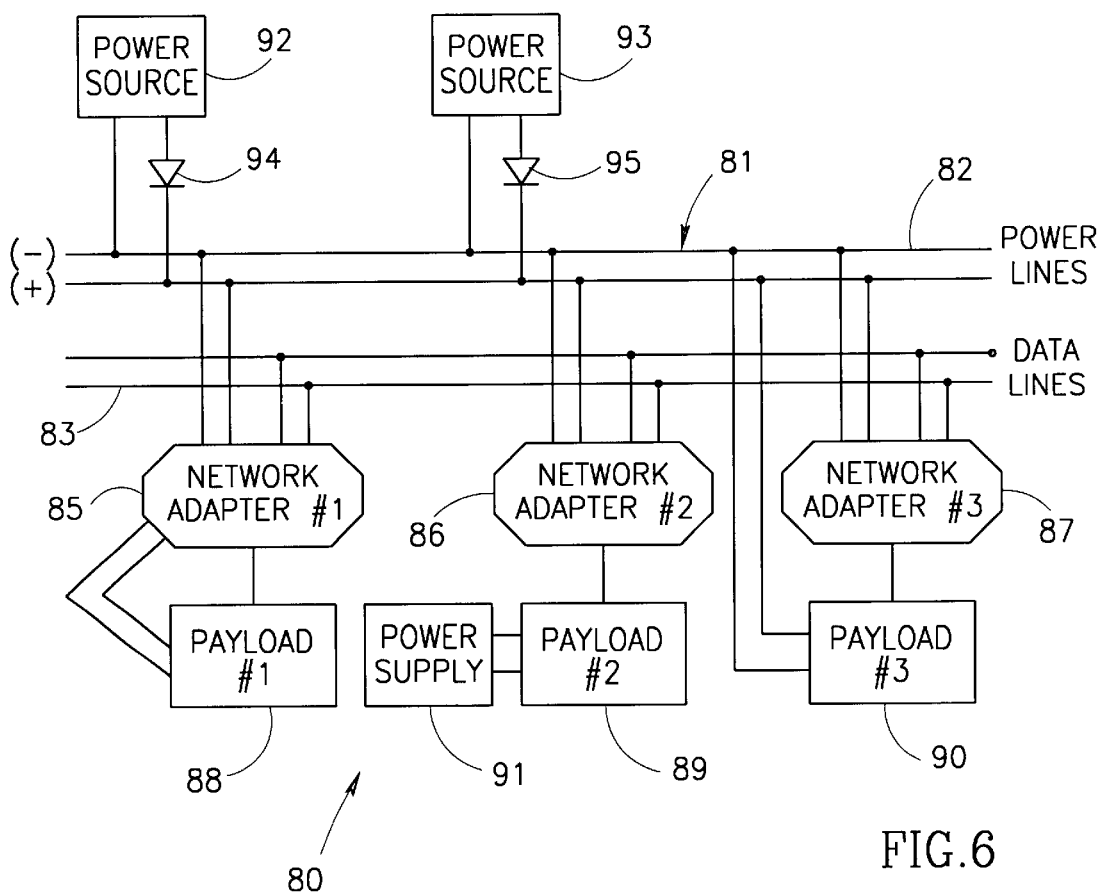
FIG. 6 is a schematic representation of a network according to a second embodiment of the invention.

FIG. 6 shows such a network 80 comprising a backbone or bus 81 having DC power lines 82 (constituting "power carrying conductors") and data lines 83. Network adapters 85, 86 and 87 are connected across both the power and data lines 82 and 83 so as to receive power and allow for bi-directional communication with other adapters via the bus. The adapters 85, 86 and 87 can be stand-alone units ('hub' units), or housed in the DTE enclosure, as is the case in network cards which are housed within a Personal Computer enclosure.

Payloads 88, 89 and 90 are connected to the adapters 85, 86 and 87 respectively. As seen, the payload 88 has both power and data connections to the adapter 88 so as to receive power therefrom and effect bidirectional data communication therewith. The payload 90 is connected directly to the power lines 82 so as to receive power directly therefrom, whilst the payload 89 is powered via a local power supply 91.

Two dedicated power sources 92 and 93 are connected to different points along the bus 81 across the power lines 82 via respective rectifier diodes 94 and 95 in the same manner as described above with reference to FIG. 4 of the drawings. In such an arrangement, as well as in other common power combining techniques, the polarity of the existing supply must be known before connecting additional supplies. However, in the case where the power carrying conductors are constituted by twisted-pair wires, it is very common that the polarity is not known due to swapping of the wires.

Figure 7:
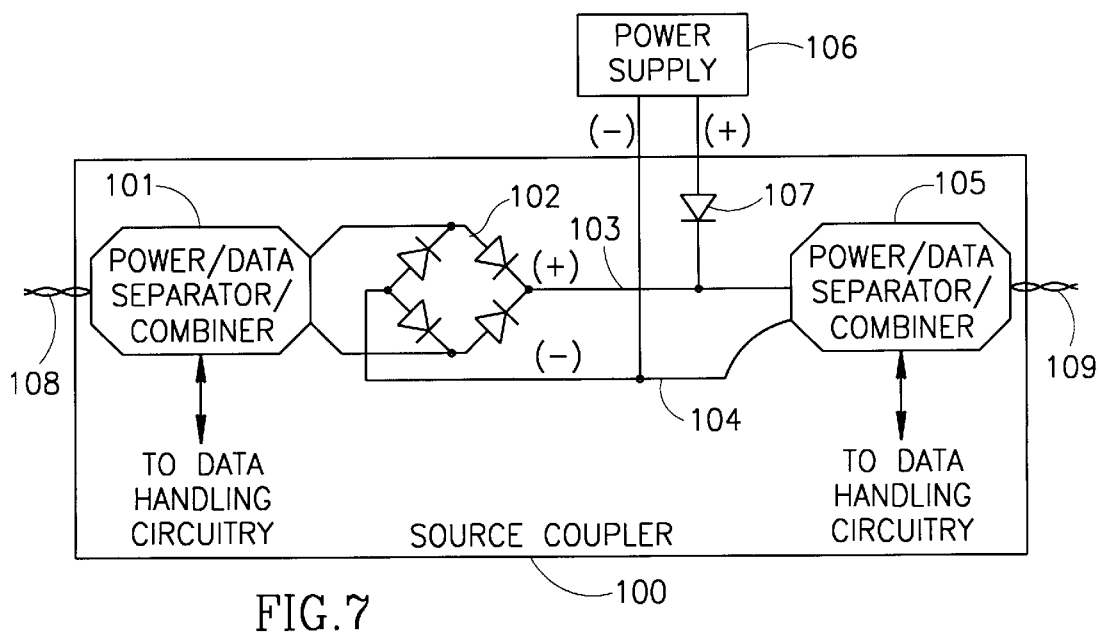
FIG. 7 is a schematic representation showing a detail of a source coupler according to a third embodiment of the invention.

FIG. 7 shows a source coupler 100 for use with the network 60 wherein the above-described problem is resolved, for the case where both power and data are carried in the same wires. The source coupler 100 includes a first Power/Data Separator/Combiner 101 whose output is connected to a bridge rectifier 102 having positive and negative supply rails 103 and 104, respectively. A second Power/Data Separator/Combiner 105 is connected across the supply rails 103 and 104 and an external DC power supply 106 is connected across the supply rails 103 and 104 via a rectifier diode 107. Twisted-pair wires 108 and 109 are connected to the first and second Power/Data Separator/Combiners 101 and 105, respectively. The bridge rectifier 102 constitutes a polarity correction means for ensuring that the correct voltage polarity is maintained across the positive and negative supply rails 103 and 104, regardless of the polarity of the twisted-pair wires 108. This permits use of the diode-summing circuitry 107 (as well as any other polarity-sensitive combiner). If desired, the source coupler 68 employed in the network 60 described above with reference to FIG. 6 of the drawings may conform to the implementation shown in FIG. 7. In this case, the power source 64 may conform to the power supply 106 shown in FIG. 7.

Figure 8:
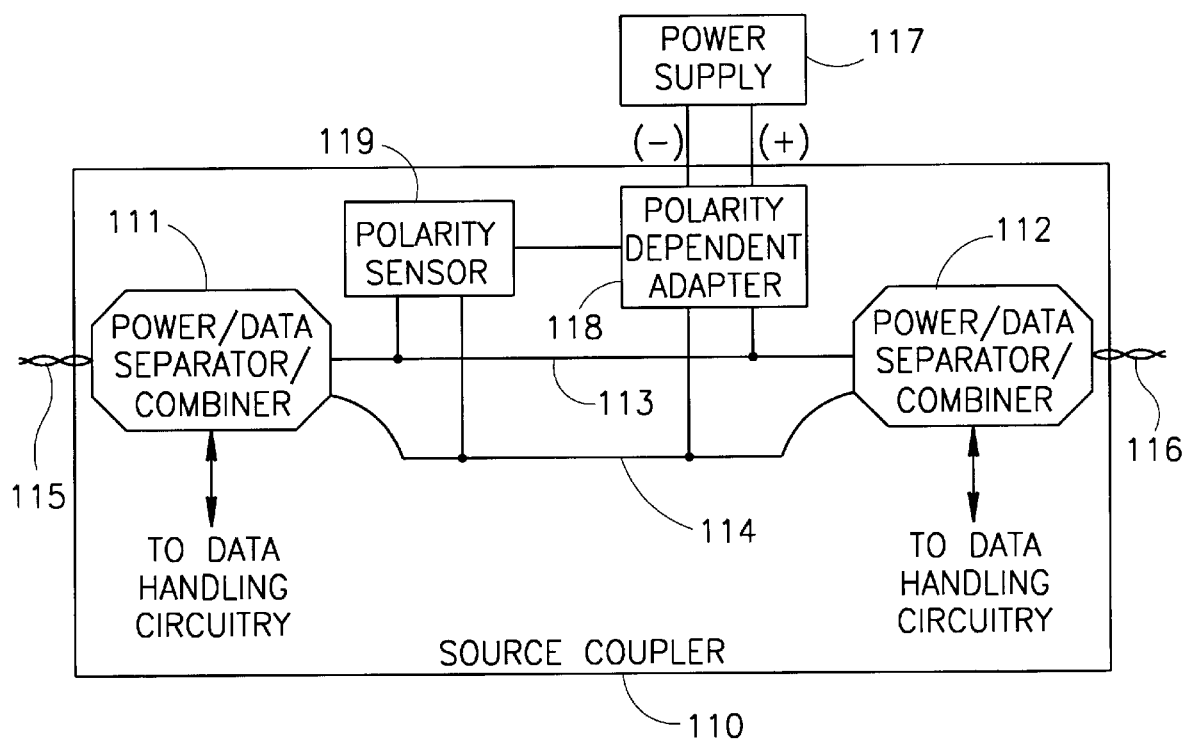
FIG. 8 is a schematic representation showing a detail of a source coupler according to a fourth embodiment of the invention.

FIG. 8 shows an alternative source coupler 110 wherein the problem of polarity inversion is solved differently. The source coupler 110 includes first and second Power/Data Separator/Combiners 111 and 112, respectively, which are interconnected by supply rails 113 and 114, whose polarity is indeterminate. Twisted-pair wires 115 and 116 are connected to the first and second Power/Data Separator/Combiners 111 and 112, respectively. An external DC power supply 117 is coupled to the supply rails 113 and 114 via a polarity-dependent adapter 118 which is itself coupled to the supply rails 113 and 114 via a polarity sensor 119. The polarity-dependent adapter 118 may use two double-throw relays, which ensure that the polarity of the feeding voltage is matched to that of the fed circuitry. In such an arrangement, the polarity-dependent adapter 118 in combination with the polarity sensor 119 constitutes a polarity correction means for ensuring that the correct voltage polarity is maintained at the output of the polarity-dependent adapter 118, regardless of the polarity of the twisted-pair wires 115 and 116.

In FIGS. 7 and 8, the source couplers are shown as standalone units to which the respective power supplies are connected. However, if desired, one or more of the source couplers may be integrated with the corresponding power supply so as to form a combined unit. Alternatively, one or more of the source couplers may be integrated into a node of the network.

Figure 1:
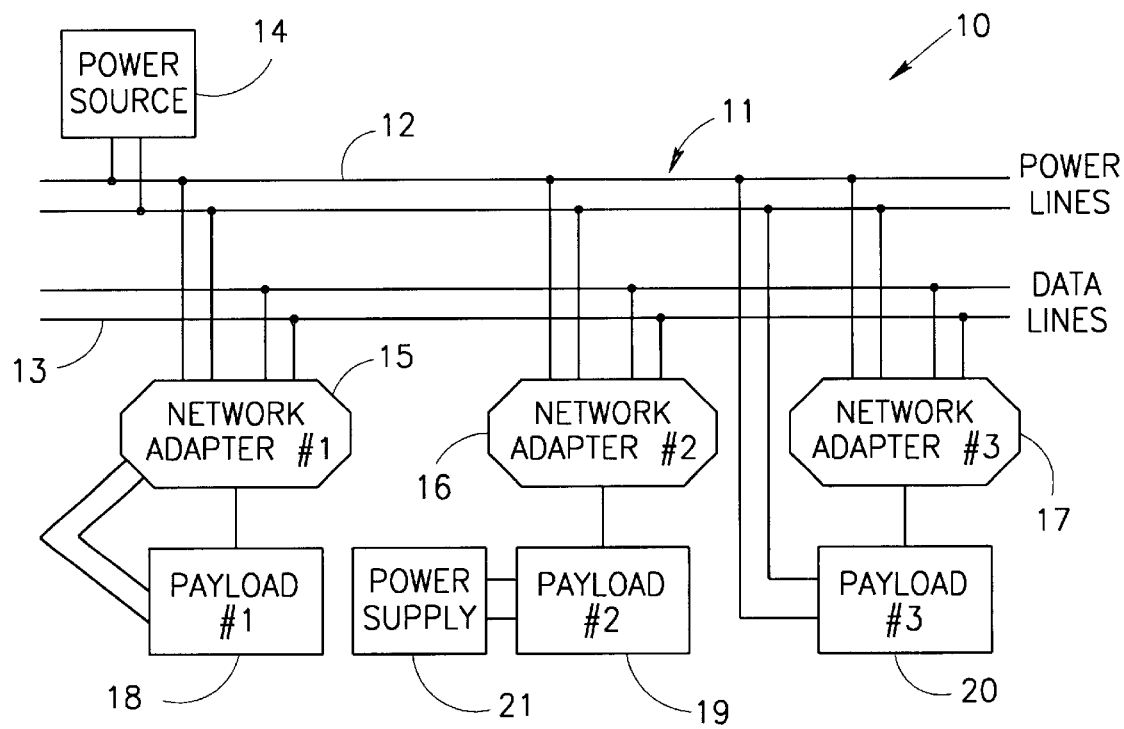
FIG. 1 is a schematic representation of a prior art network having multiple network adapters coupled in parallel to a common bus.
Figure 2:
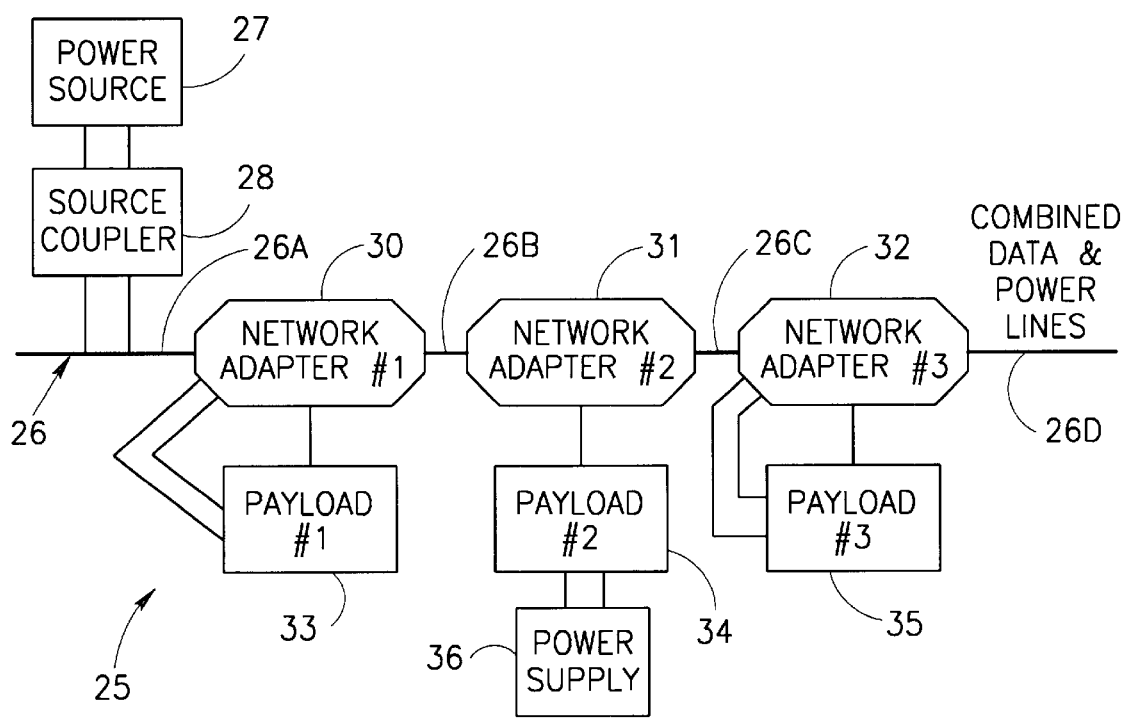
FIG. 2 is a schematic representation of a prior art network having multiple network adapters coupled in series forming a cascade bus.
Figure 3:
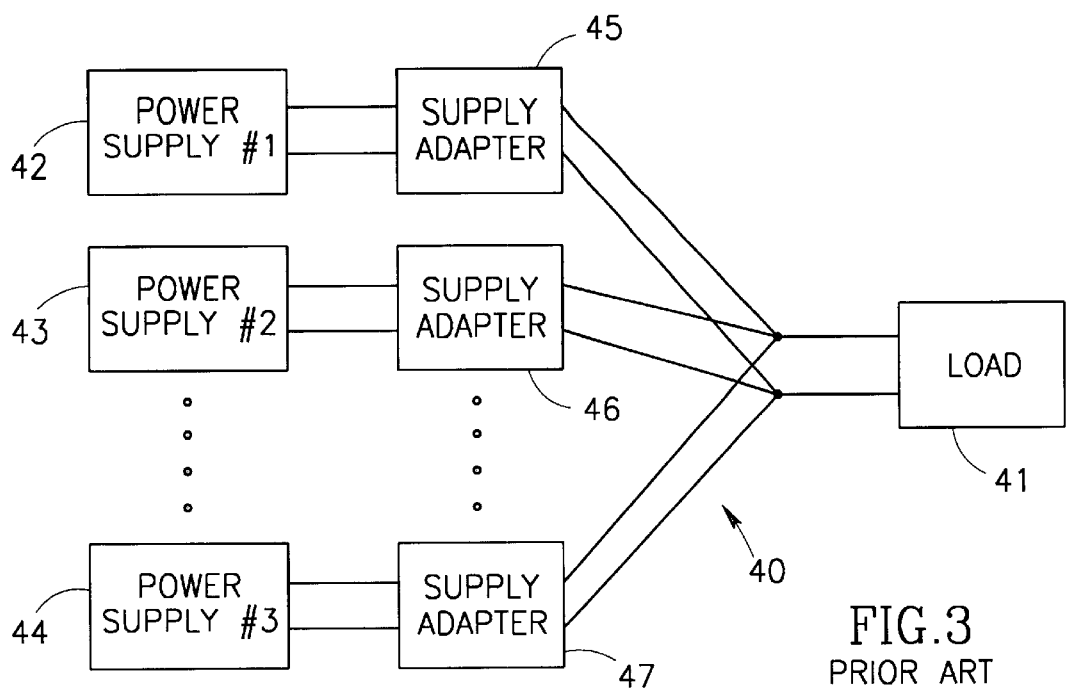
FIG. 3 is a schematic representation showing a prior art approach to supplying power to a single load via multiple power supplies.
Figure 9:
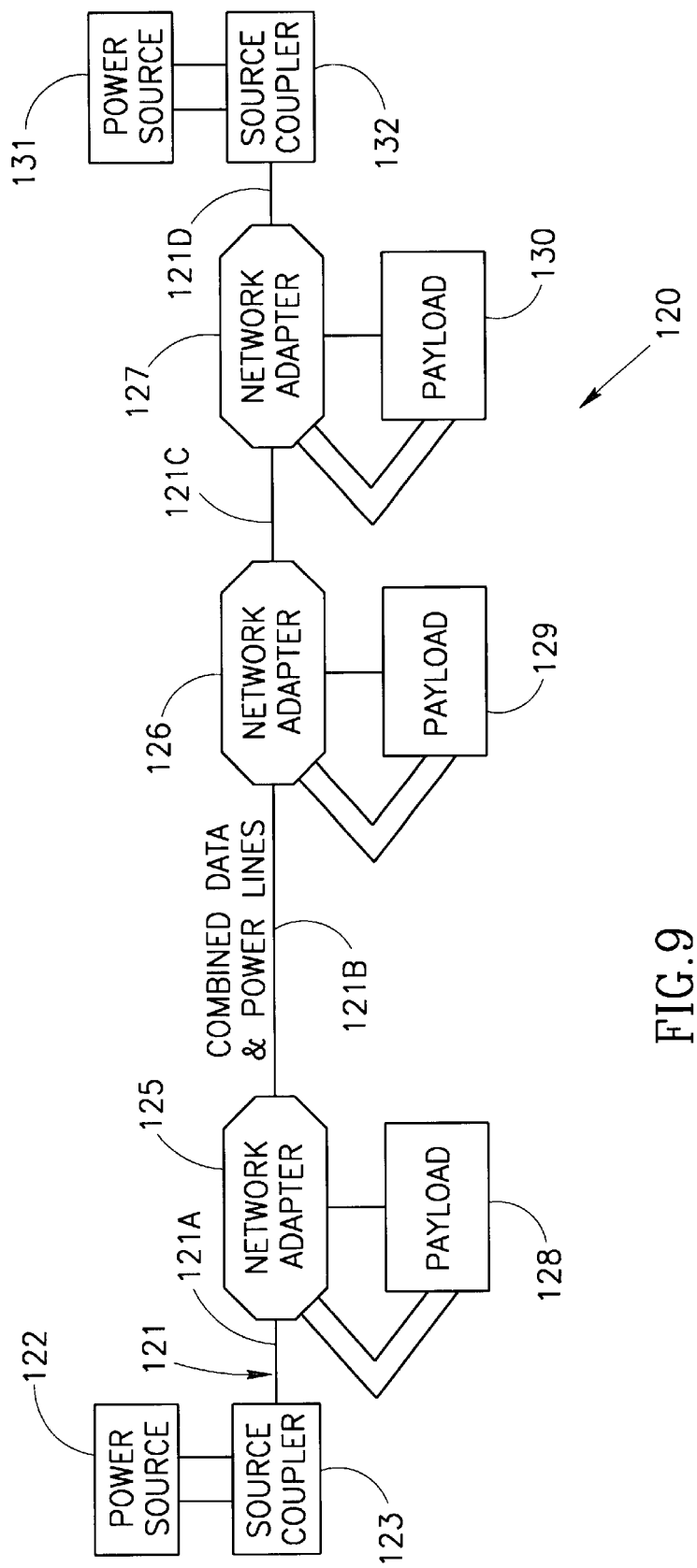
FIG. 9 is a schematic representation of a network according to a fifth embodiment of the invention.

FIG. 9 shows schematically a network 120 similar to that described above with reference to FIG. 2 but fed by a pair of power sources. The network 120 comprises a bus shown generally as 121 fed by a first power source 122 which is interfaced to the bus 121 by means of a source coupler 123. The source coupler 123 ensures that the low-source impedance and supply noise do not affect the data communication in the network. Network adapters or nodes 125, 126 and 127 are serially connected to the bus 121 via independent bus sections 121a, 121b, 121c and 121d so as to receive combined power and data signals therefrom and feed data signals thereto. Payloads 128, 129 and 130 are connected to the adapters 125, 126 and 127 respectively. All of the payloads 128, 129 and 130 have both power and data connections to the respective adapters 125, 126 and 127 so as to receive power therefrom and effect bidirectional data communication therewith. A second power source 131 is interfaced to the bus 121 by means of a second source adapter 132.

Figure 10:
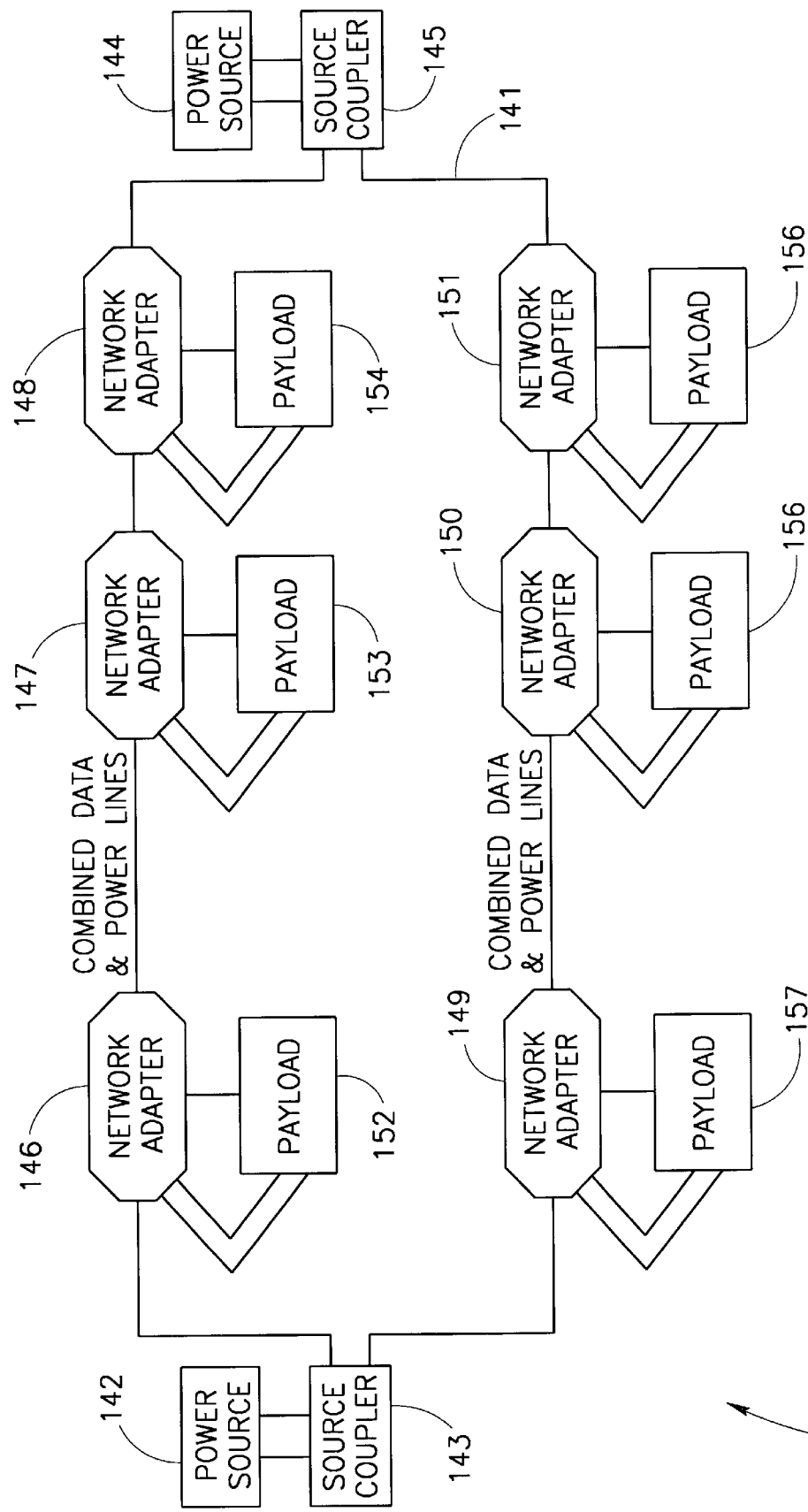
FIG. 10 is a schematic representation of a network according to a sixth embodiment of the invention.

FIG. 10 shows schematically a ring-type network 140 fed by a pair of power sources. The network 140 comprises a bus 141 fed by a first power source 142 which is interfaced to the bus 141 by means of a first source coupler 143 which is serially connected with the bus 141. A second power source 144 is interfaced to the bus 141 by means of a second source coupler 145 also serially connected with the bus 141. The source couplers 143 and 145 ensure that the low-source impedance and supply noise do not affect the data communication in the network. Network adapters or nodes 146, 147, 148, 149, 150 and 151 are serially connected with the bus 141 so as to receive combined power and data signals therefrom and feed data signals thereto. Payloads 152, 153, 154, 155, 156 and 157 are connected to the adapters 146, 147, 148, 149, 150 and 151, respectively. All of the payloads 152, 153, 154, 155, 156 and 157 have both power and data connections to the respective adapters 146, 147, 148, 149, 150 and 151 so as to receive power therefrom and effect bidirectional data communication therewith.

As noted above, the networks 120 and 140 shown in FIGS. 9 and 10, respectively, provide added security and flexibility over prior art Ethernet and token ring equivalent networks. The principal advantages offered by the invention relate to fault protection as follows:

Protection against break

The use of multiple power supplies provides power continuity in the event of a single cut in the power lines within the network wiring (or within node). Network planners have to take care that each wire portion is being fed from both sides: hence in the case of break in the power line both sides of the break still feed power for the respective units in each side. In the case of the 'linear' (i.e. straight) bus 121 shown in FIG. 9, the simplest configuration involve connecting two power supplies, each in an opposite end of the network. Each power supply should be capable of powering the whole network alone.

In the network shown FIG. 9 any break will result in an interruption of communication only, power still being conveyed to all units. However, in the ring topology shown in FIG. 10, where two power supplies are located in two different points in the network, a single break in the bus does not affect system operation and allows both power and data to continue uninterrupted via alternate routes.

Protection against Short

The above mentioned topologies as well as the use of multiple powering systems, whilst protecting against breaks in the bus, do not provide protection against shorts. Any short in the power carrying conductors in the network, whether in the wiring which are susceptible to such phenomena, or inside the nodes will cause immediate collapse of the powering to the whole network.

In order to allow for reduced damage to the system in case of shorting, the power distribution system must include current limiting devices. Such devices can be current limiting circuits as well as resettable and non-resettable fuses.

However, the resettable fuse is preferred since no maintenance action is required after recovery, and this is also the most cost-effective solution. Usually thermal fuses are used as described for example in U.S. Pat. No. 4,101,862 (Takagi et al.) However, PTC-based units are preferred, as described in U.S. Pat. No. 4,238,812 (Middleman et al.) These current-handling units must be in series with the current. The units may either be integrated into the source couplers or nodes, or be added as standalone units.

Figure 11:
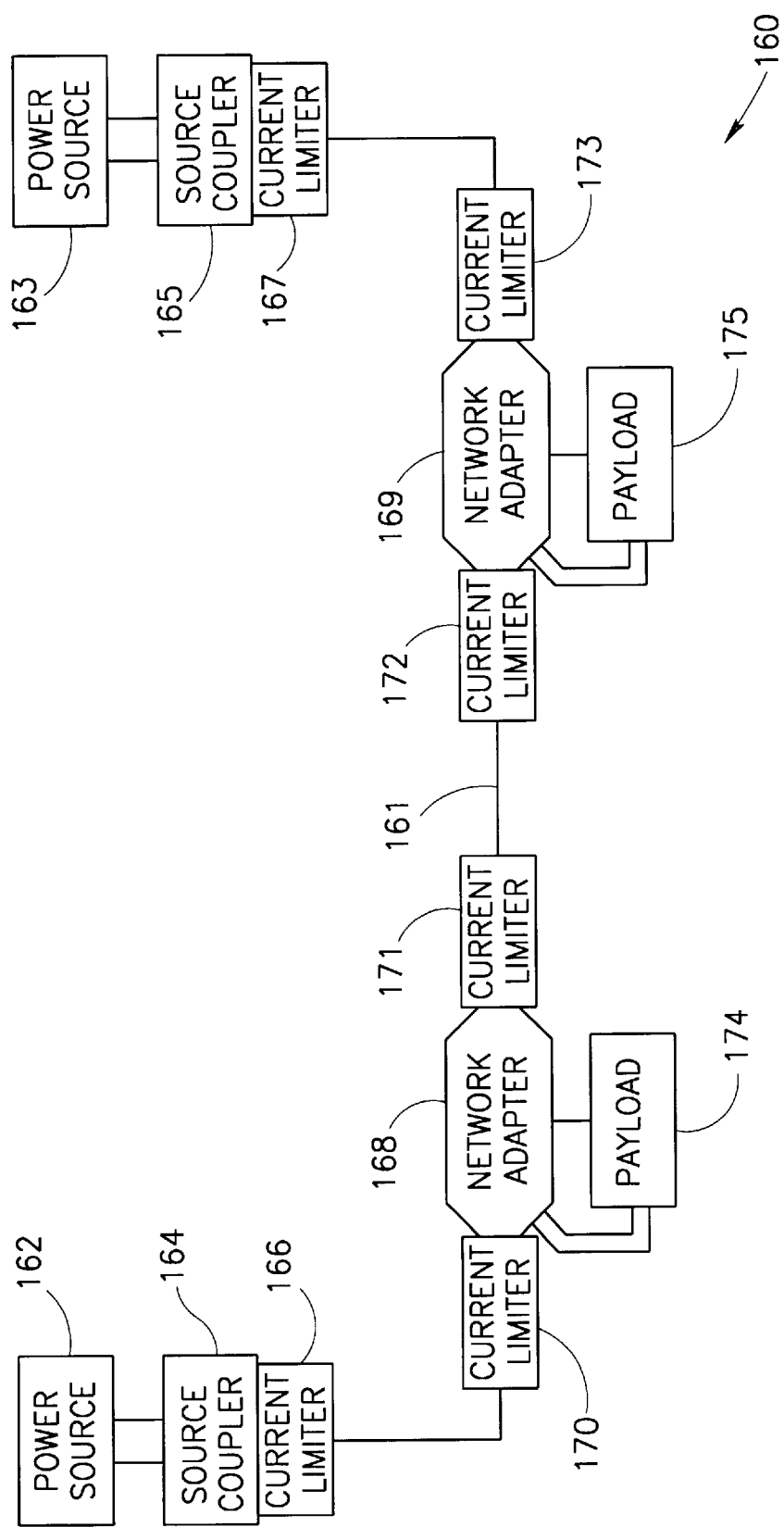
FIG. 11 is a schematic representation of a network according to a seventh embodiment of the invention.

FIG. 11 shows such a serial cascaded network 160 in which current limiters are located at both ends of each wiring segment. The network 160 comprises a bus 161 powered by a pair of power sources 162 and 163 each interfaced to the bus 161 via respective source adapters 164 and 165, which in turn are connected in series with the bus 161 via respective current limiters 166 and 167. Network adapters 168 and 169 are serially connected to the bus 161 and are straddled on both sides by respective current limiters 170, 171 and 172, 173. Payloads 174 and 175 are connected to the network adapters 168 and 169, respectively.

In the case of a short in any of the power carrying wiring portions, power can still be conveyed to all the nodes via alternative routes.

Similarly, in the event that a ring topology is used, in conjunction with a multiple power supply scheme, the network can be fully protected against single short in the system, since there is always an alternative route for carrying power to all nodes in the system.

Remote sensing/Sources coordination

As explained above, it is known from U.S. Pat. Nos. 4,609,828 and 5,200,643 that the power system performance can be improved if some coordination/synchronization exists between the power supplies sharing the load. For example, stress equalization can take place (by means of current sharing, for example), resulting in maximum system reliability. In addition a 'master-slave' mechanism can be implemented. There are described below four different ways in which such synchronization can be implemented.

1. Additional dedicated wiring for coordination of the power supplies must be added to the system. The extra wiring interconnects the power supplies directly, or the source adapters, as required. The latter is required mainly in the case where the source couplers comprise functionality dealing with the synchronization of the power supplies in the network. An example for such added-wiring system is described in U.S. Pat. Nos. 4,609,828 and 5,768,117.

2. No changes are required in the network itself. The power supply or the source adapter contains circuitry allowing for the required synchronization, and the topology as shown in above-described figures is unchanged. Such apparatus is described above (using OR-ing diodes), as well in U.S. Pat. Nos. 3,824,450 (Johnson et al.) and 5,200,643, for example.

3. The existing network wiring is used also for transporting the synchronization data, without affecting the data communication in the network. Superimposing the synchronization signals on the network data may be based on FDM (Frequency Domain Multiplexing), TDM (Time Domain Multiplexing) or phantom connections (using voltage difference between pairs or between pair and ground). This solution requires a specific interface to be added to each power supply/source coupler.

4. Alternatively, the data exchange required for power-system coordination can be carried as part of the network regular traffic. Examples of this scenario are remote sensing of current or voltage or both. In such a configuration, the specific circuitry senses the voltage or current at specific points in the network. The data is digitized, and communicated over the network as normal data. In or near the power supply, the relevant data is extracted, converted to analog (if required), and used for controlling the power supply. The sensing and digitizing function can be housed in a standalone unit or, better still, integrated with a node. Similarly, the power supply related circuitry may be integrated into the power supply or, even better, within the source coupler.

What is claimed is:

1. A network allowing for communication, sensing and control, said network comprising:

at least three nodes interconnected by a bus for conveying both power and data to at least one node, said bus including at least two power carrying conductors, and at least two source couplers connected across the power carrying conductors at different points thereof and being capable of being fed by mutually independent power supplies for feeding power simultaneously to said different points of the network.

2. The network according to claim 1, further including a payload connected to at least one of the nodes, and fed from the power carrying conductors in the bus.

3. The network according to claim 1, wherein the bus includes separate conductors for conveying power and data.

4. The network according to claim 1, wherein the bus conveys power and data together along the power carrying conductors.

5. The network according to claim 1, wherein each of said source couplers includes a rectifier diode connected in series with an output of the respective power supply.

6. The network according to claim 1, wherein each of the source couplers includes a pair of supply rails connected to a polarity correction means for ensuring that a correct voltage polarity is maintained across the supply rails regardless of a polarity of the power carrying conductors.

7. The network according to claim 6, wherein the polarity correction means includes:

a polarity sensor coupled across the supply rails for determining a polarity thereof, and a polarity-dependent adapter for adapting the polarity of the respective power supply to the polarity of the supply rails.

8. The network according to claim 6, wherein the polarity correction means includes:

a bridge rectifier for coupling the power carrying conductors to the supply rails such that the voltage polarity of the supply rails is invariant.

9. The network according to claim 1, wherein at least one of the source couplers is integrated into one of the nodes.

10. The network according to claim 1, including at least one current limiting circuit.

11. The network according to claim 10, wherein the at least one current limiting circuit includes a fuse.

12. The network according to claim 11, wherein the fuse is resettable.

13. The network according to claim 12, wherein the fuse is PTC based.

14. The network according to claim 10, where the current limiting circuit is embedded within one of the nodes.

15. The network according to claim 10, wherein the current limiting circuit is a standalone unit.

16. The network according to claim 1, including synchronization means for synchronizing between said power supplies.

17. The network according to claim 16, wherein the synchronization means comprises dedicated wiring in the network.

18. The network according to claim 16, wherein the synchronization means superimposes synchronization data on the bus.

19. The network according to claim 18, where the synchronization data is embedded with the data carried in the network.

* * * * *